US006824338B2

(12) United States Patent
Looker

(10) Patent No.: US 6,824,338 B2
(45) Date of Patent: Nov. 30, 2004

(54) AIR TRANSPORT MODULAR CONTAINER SYSTEM

(75) Inventor: Robert Looker, El Segundo, CA (US)

(73) Assignee: Satco, Inc., El Segundo, CA (US)

(*) Notice: Subject to any disclaimer, the term of this patent is extended or adjusted under 35 U.S.C. 154(b) by 51 days.

(21) Appl. No.: 10/157,643

(22) Filed: May 28, 2002

(65) Prior Publication Data
US 2003/0223838 A1 Dec. 4, 2003

(51) Int. Cl.$^7$ .................................................. B60P 7/08
(52) U.S. Cl. ........................... 410/67; 410/66; 410/35; 410/46; 410/80; 410/82; 410/84
(58) Field of Search ........................... 410/66, 67, 46, 410/35, 84, 77, 80, 82; 108/55.1, 55.5, 55.3; 244/118.1, 137.1; 248/346.02, 346.03

(56) References Cited

U.S. PATENT DOCUMENTS

| | | | | | |
|---|---|---|---|---|---|
| 1,360,412 | A | * | 11/1920 | Kirchner | 410/67 |
| 2,351,314 | A | * | 6/1944 | Ario | 410/67 |
| 4,929,133 | A | * | 5/1990 | Wiseman | 410/52 |
| 5,433,550 | A | | 7/1995 | Huber | |
| 5,772,369 | A | * | 6/1998 | Lerman et al. | 410/96 |
| 5,865,579 | A | * | 2/1999 | Thomas | 410/92 |
| 6,027,291 | A | * | 2/2000 | Sain et al. | 410/35 |
| 6,210,088 | B1 | * | 4/2001 | Crosby | 410/35 |
| 6,485,239 | B2 | * | 11/2002 | Afful | 410/80 |
| 6,491,485 | B2 | * | 12/2002 | Zavitz | 410/91 |
| 6,524,040 | B1 | * | 2/2003 | Heil | 410/67 |
| 6,561,739 | B1 | * | 5/2003 | Garala | 410/46 |
| 6,595,731 | B1 | * | 7/2003 | Johansson et al. | 410/52 |
| 2001/0038777 | A1 | * | 11/2001 | Cassell, Jr. | 410/84 |
| 2002/0005150 | A1 | | 1/2002 | Taylor | |

FOREIGN PATENT DOCUMENTS

EP          1188665 A1      3/2002

* cited by examiner

Primary Examiner—Stephen Gordon
(74) Attorney, Agent, or Firm—Perkins Coie LLP

(57) ABSTRACT

An air cargo container assembly for rapid air shipment of emergency and other supplies, without netting, includes sub-containers attachable to a base plate via locking mechanisms on the sub-containers. The locking mechanisms pass through openings in the base and engage a downward-facing surface of the base. Each locking mechanism includes a latch having a rotatable shaft, a head connected to a bottom end of the shaft, a plate connected to a top end of the shaft. A spring biases the plate toward the bottom surface of the sub-container. A lever is attached to the shaft between the head portion and the spring. The shaft and head portion are rotatable between an unlocked position and a locked position via the lever. One or more guide members may be mounted on the base to help align the sub-containers.

23 Claims, 6 Drawing Sheets

AIR TRANSPORT MODULAR CONTAINER SYSTEM

BACKGROUND OF THE INVENTION

Air cargo containers are commonly used to transport various types of cargo. Air cargo containers are generally loaded with cargo at a remote location, transported to an airport or airstrip by truck, and are then loaded into aircraft using specialized equipment. To improve homeland security, the Center for Disease Control has begun to stockpile smaller modular air cargo containers (known as sub-containers) containing emergency medical supplies, such as smallpox vaccines. These emergency air cargo containers or sub-containers may be often stored at transportation hubs, such as Federal Express (FedEx) and United Parcel Service (UPS) depots, so that they may be transported quickly to areas where the supplies are needed.

As these sub-containers or modular containers are used to store a large supply of items, when loaded, they may weigh up to 2500 pounds or more. Unlike most other air cargo containers, the sub-containers have caster wheels, or other suitable wheels, so that the containers may be readily moved by hand.

When these types of air cargo containers are shipped, they are generally loaded onto pallets with a forklift, and are then covered with nets to secure the containers to the pallets. The pallets loaded with the containers are then moved into an airplane or truck with a forklift or a conveyor system.

This system of loading containers onto pallets, securing nets over the containers, and then loading the pallets into an airplane or truck, has several disadvantages. First, the process is time-consuming, particularly the netting portion of the process. Moreover, specialized skill is required to properly load the containers onto pallets with a forklift, and to properly secure the containers to the pallets with nets. Additionally, the caster wheels on the containers rest on the substantially flat pallet surfaces during transport, which may lead to the containers rolling off of the pallets, particularly during rough transport.

As a result, the shipment of supplies contained within the air cargo containers may be delayed. In the case of emergency medical supplies, the potential delays associated with current transportation processes are unacceptable. Accordingly, a more efficient system of transporting air cargo containers, and especially for transporting sub-containers containing emergency medical supplies, is urgently needed.

SUMMARY OF THE INVENTION

In a first aspect, a modular air cargo container assembly includes sub-containers secured to a base or pallet via locking mechanisms located on the sub-containers. The locking mechanisms preferably pass through openings in the base and engage a bottom surface of the base. Since the sub-containers are secured in place by the locking mechanisms, securing the sub-containers with netting is not needed. Additionally, the sub-containers are much more quickly, reliably, and easily secured to the base, which reduces transport time and complexity.

In a second aspect, the base or pallet comprises a metal plate, preferably an aluminum plate, having openings through which the locking mechanisms on the sub-containers pass to engage a bottom surface of the base. As the base is similar in size and shape to existing bases, it can be handled by existing airport and/or shipping depot equipment.

In a third aspect, a locking mechanism on the container comprises a latch having a rotatable shaft. A head is connected to a bottom end of the shaft. A plate is connected to a top end of the shaft. A spring biases the plate toward a latch pin. A lever is attached to the shaft between the head portion and the spring. The shaft and head are rotatable between an unlocked position and a locked position via the lever. The locking mechanism is quickly and easily used to lock a sub-container onto the base, without the need for tools or netting.

In a fourth aspect, one or more guide members are mounted to a top surface of the base, preferably in a substantially cross-shaped pattern. The guide members automatically position sub-containers on the top surface of the base, so that the locking mechanisms are properly aligned with corresponding openings or fittings on the base.

In a fifth aspect, in a method of securing containers to a base, locking mechanisms on the containers are engaged to the base. The containers are quickly and easily, yet securely, attached to the base, for shipment by air or ground.

Other features and advantages of the invention will appear hereinafter. The invention resides as well in sub-combinations of the features described.

DETAILED DESCRIPTION OF THE DRAWINGS

Figure 1:
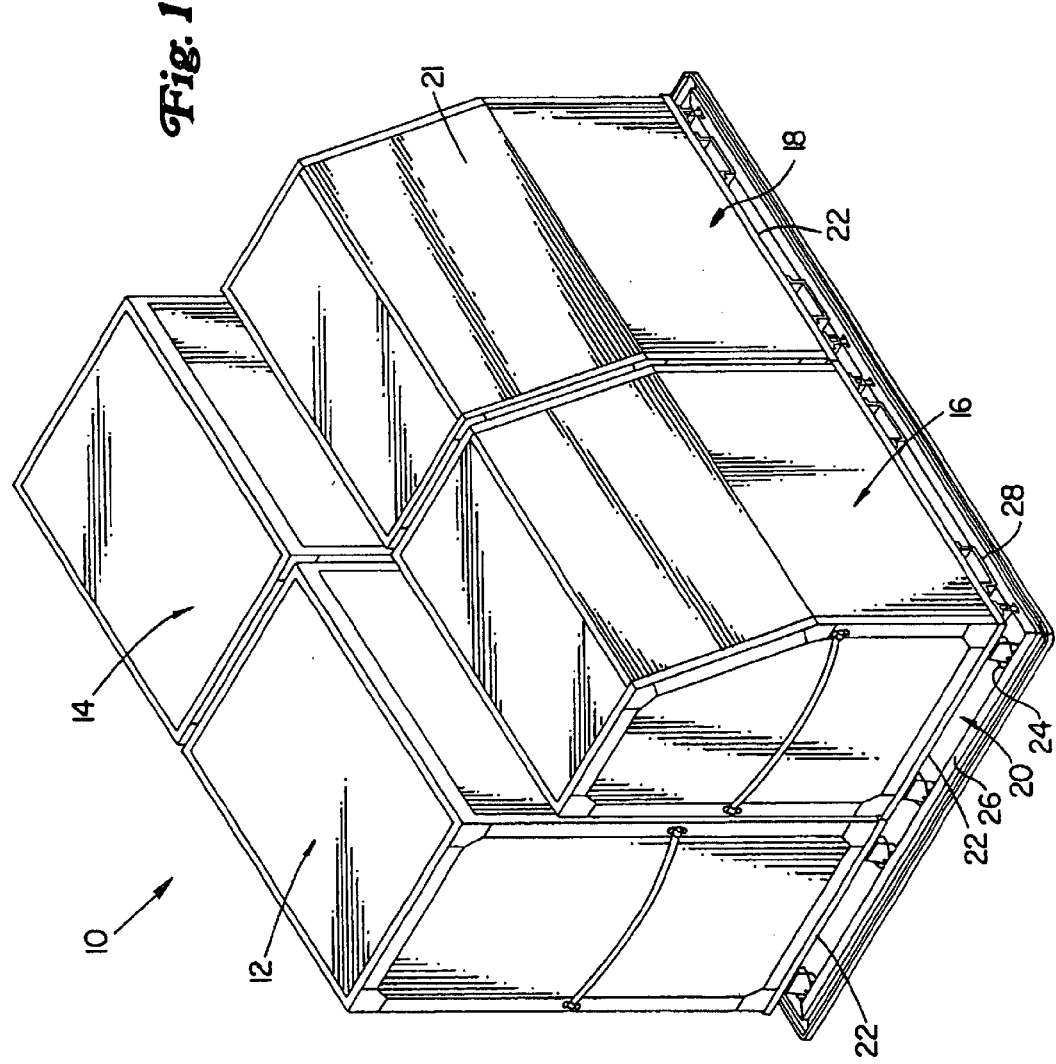
FIG. 1 is a perspective view of a preferred modular container assembly.

FIG. 1 illustrates a modular container assembly or system 10 according to a preferred embodiment. The container assembly 10 includes a plurality of sub-containers detachably mounted to a base plate or structure 20, or container support structure. Four sub-containers 12, 14, 16, 18 are shown detachably mounted to a rectangular base 20 in FIG. 1. Two sub-containers 12, 14 having a rectangular cross-section in a lengthwise and a widthwise direction, and two sub-containers 16, 18 having a truncated right trapezoidal cross-section in a lengthwise direction, are shown in FIG. 1 for illustration purposes. Of course, various numbers of sub-containers, having any suitable shape or configuration, may be employed in the container assembly 10. Detachably mounted means having the capability to be attached or secured (e.g., during transport), and also able to be released (e.g., during actual loading and unloading of the containers onto the base).

The sub-containers are preferably metal, such as aluminum, or any other material suitable for securely containing and transporting a large volume of items, such as a large quantity of emergency medical supplies. The sub-containers are preferably formed of extruded aluminum sections, with the sections attached to one another via rivets, welds, or other suitable attachments. The base 20 is typically a metal plate 0.12 to 0.25 or 0.16 to 0.19 inches thick.

Each sub-container preferably includes a door 21 or a removable cover for providing access into the sub-container. Items, such as medical supplies, may be loaded into and unloaded out of the sub-container via the door 21. The door 21 is preferably lockable via a lock, latch, or other suitable locking mechanism, so that the door 21 remains closed during transport of the sub-container.

Figure 2:
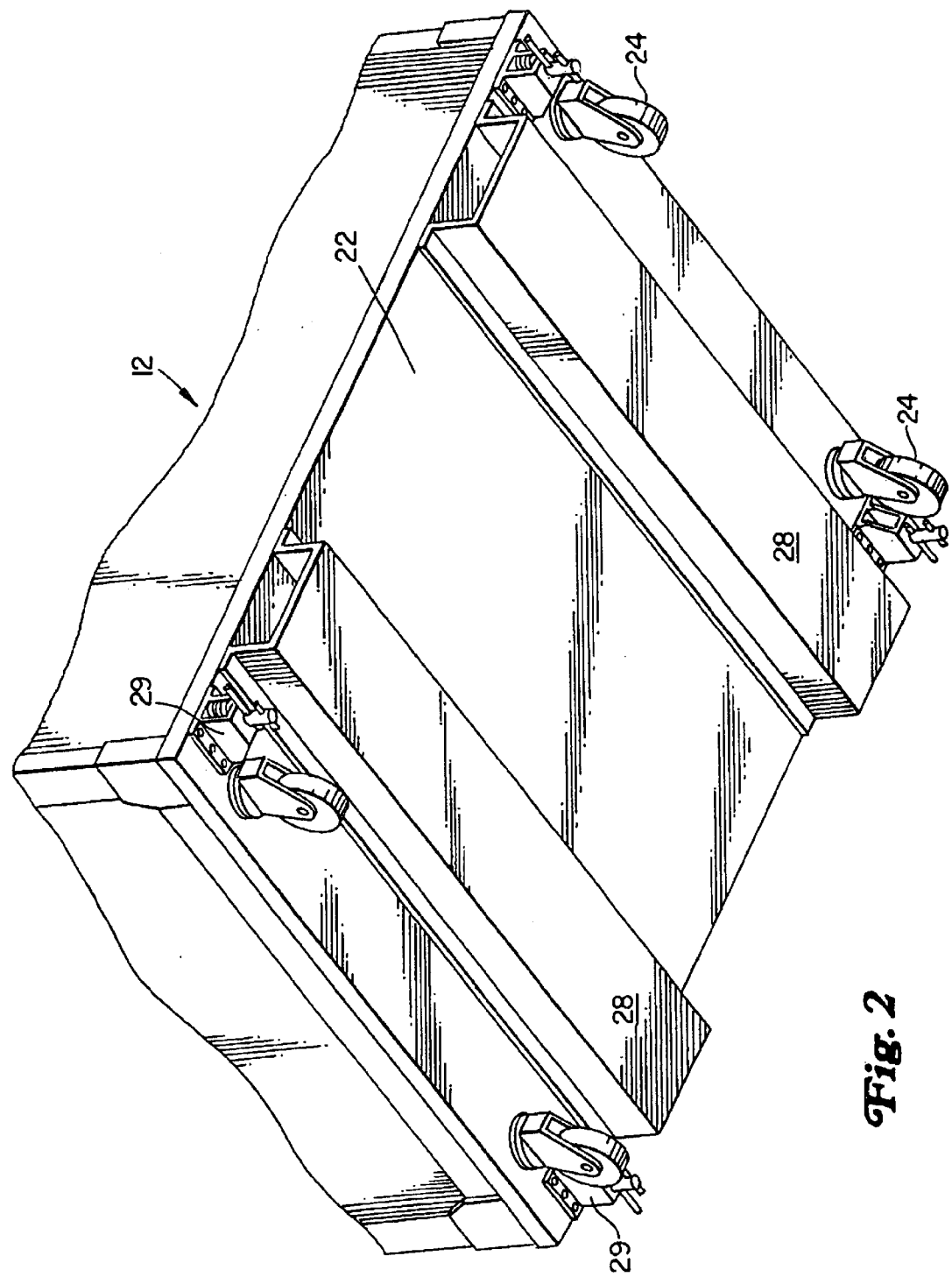
FIG. 2 is a partial bottom perspective view of a sub-container used in the modular container assembly of FIG. 1.

As shown in FIG. 2, the sub-container 12 preferably includes a plurality of caster wheels 24, or other wheels or rollers, attached to a bottom surface of the base section 22.

The sub-container 12 may optionally include a pair of forklift guides 28 attached to the bottom surface of the base section 22. The guides 28 receive the forks of a forklift. If provided, the forklift guides 28 allow the sub-container 12 to be readily raised and lowered for storage and/or for delivery at locations where a relatively smooth rolling surface is not available.

The sub-container 12 further includes one or more locking or securing mechanisms 29 on a bottom surface of the base section 22. In a preferred embodiment, four locking or securing mechanisms 29, one near each corner of the base section 22, are attached to the base section 22, as illustrated in FIG. 2. The locking mechanisms 29 may comprise any devices suitable for securing and releasing a sub-container to and from the base 20.

The locking mechanisms 29 may be located in front of the caster wheels 24 near the outer edges of the base section 22, as illustrated in FIG. 2, or may be located at any other suitable location on the base section 22. The locking mechanisms 29 are preferably positioned so that they may be aligned with latch engagement openings 34, or latch engagement structures or devices, in the base 20. In one configuration, two of the locking mechanisms 29 may be located in front of the two "front" caster wheels 24, and two other locking mechanisms 29 may be located to the side of the "rear" caster wheels 24, so that all of the locking mechanisms 29 may engage openings 34, or latch engagement devices, at the edges of the base 20.

Figure 3:
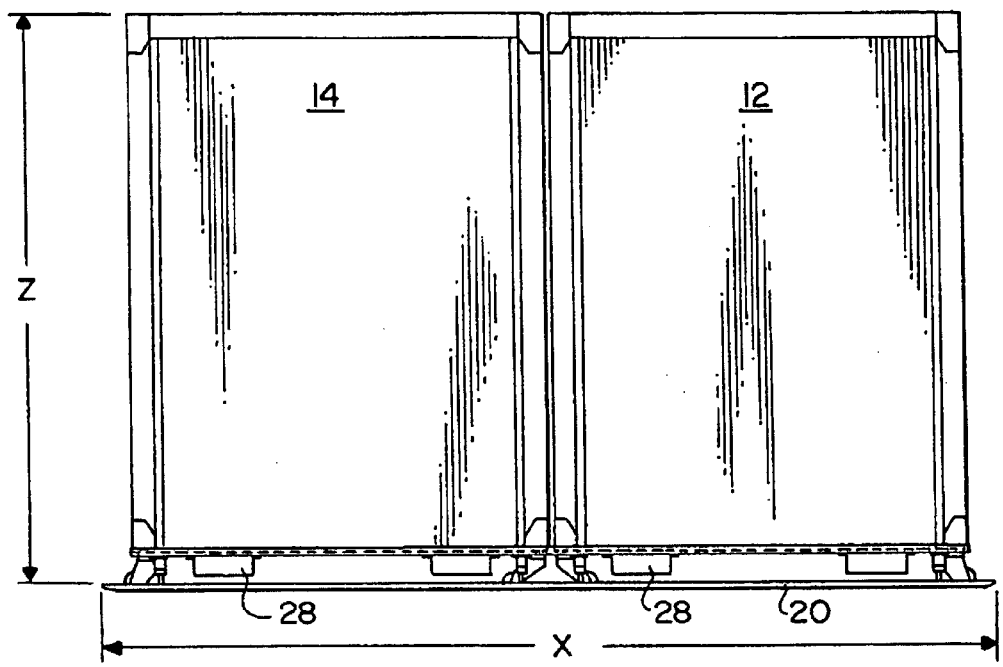
FIG. 3 is a back view of the modular container assembly of FIG. 1.
Figure 4:
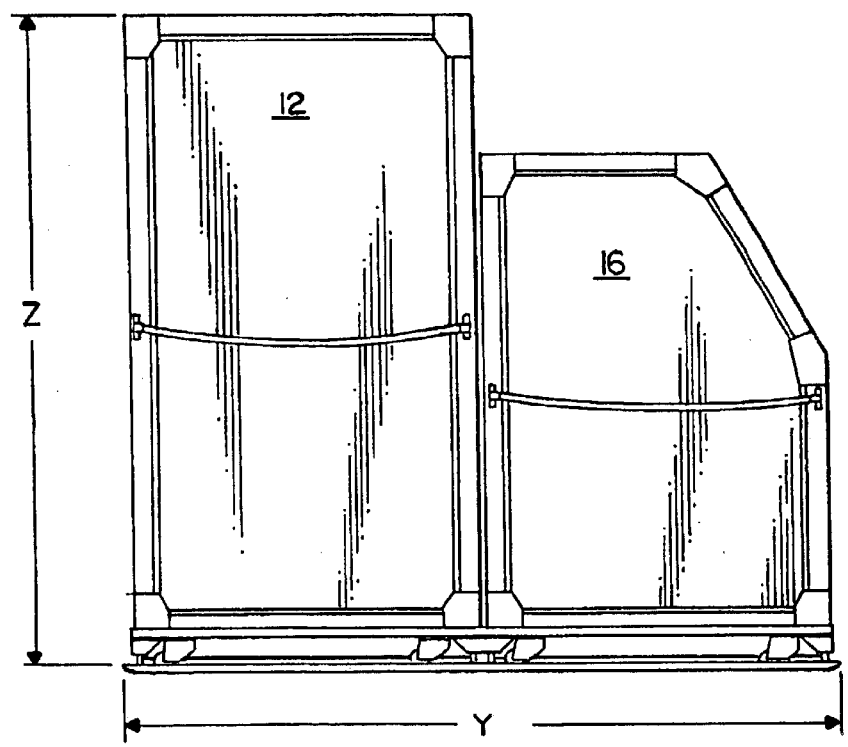
FIG. 4 is a side view of the modular container assembly of FIG. 1.
Figure 5:
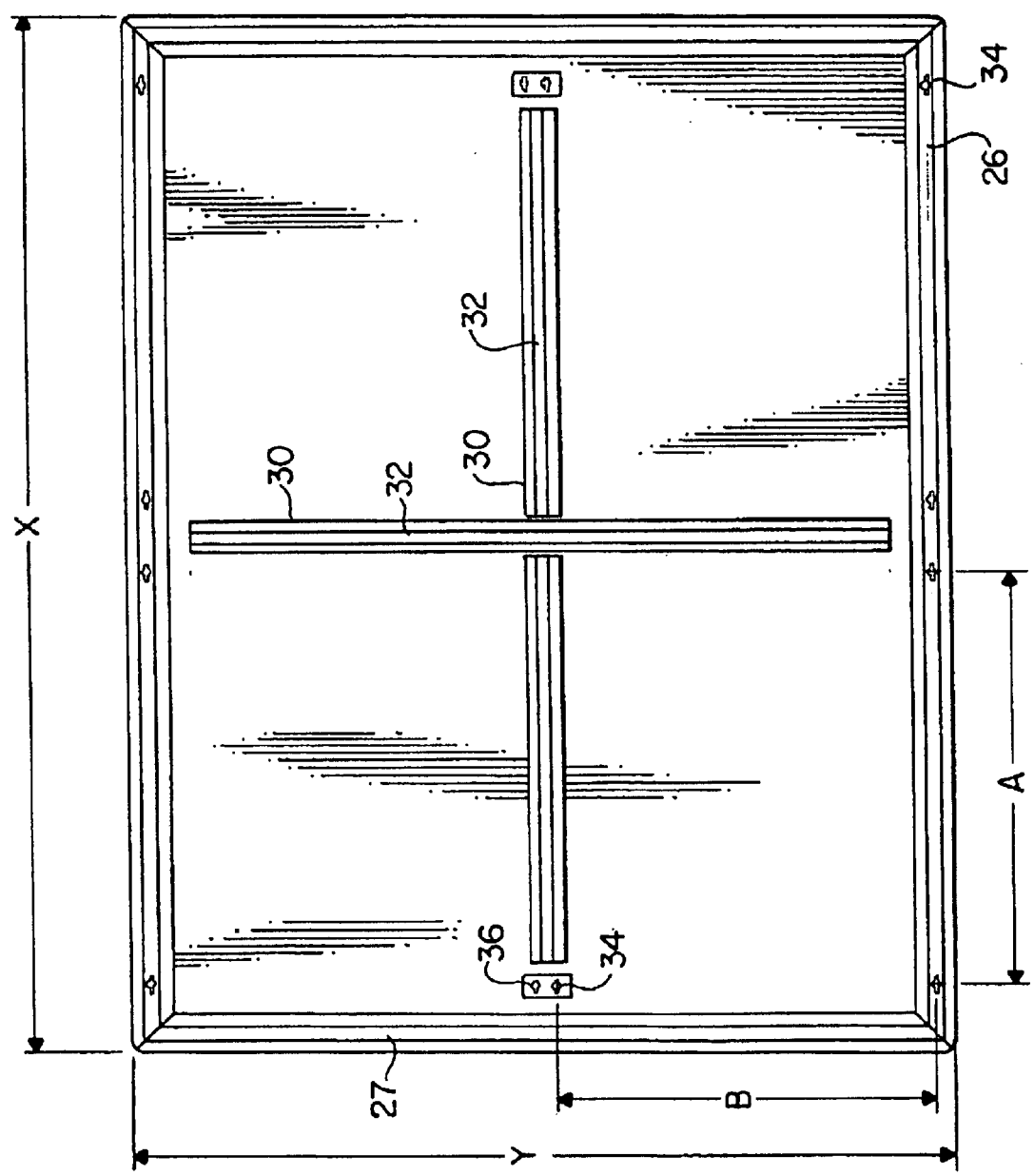
FIG. 5 is a plan view of a base used in the container assembly of FIG. 1.

Turning to FIGS. 3–5, a preferred base 20 has a length X of approximately 110 to 140 inches, more preferably from 120 to 130 inches, and a width Y of approximately 75 to 100 inches, more preferably from 83 to 93 inches. The dimensions of the base 20 may be varied, however, to accommodate the size required by the aircraft loading system.

Each sub-container preferably has a height Z of approximately 50 to 100 inches, more preferably from 60 to 80 inches. The base section 22 of each sub-container is preferably substantially rectangular in shape such that the sub-containers may be arranged in a substantially rectangular fashion on the base 20. Each sub-container base section 22 preferably has a length of approximately 45 to 55 inches and a width of approximately 35 to 45 inches. In a preferred embodiment, a plurality of sub-containers having uniform base sections 22 are employed so that they may be interchanged between base 20, and between storage positions on a given base 20.

As shown in FIG. 5, one or more guide members 30 are attached to a top surface of the base 20 for aligning sub-containers on the base 20. Each guide member 30 preferably includes a raised divider or bumper rail 32 against which the base section 22, or other suitable section, of a sub-container may bear in order to align the sub-container for subsequent locking. Alternatively, the wheels 24 may bear against the guide members 30 to align the sub-container for subsequent locking.

The perimeter of the base 20 preferably includes an elevated lengthwise edge rail 26, and an elevated widthwise edge rail 27, attached to the base. The edge rails 26, 27 help align the sub-containers on the base 20, and to prevent the sub-containers from rolling off of the base 20 during the process of securing the sub-containers to the base 20.

Each lengthwise edge rail 26 preferably includes two pairs of latch engagement openings 34, although a greater or lesser number of latch engagement openings 34 may be included on any given edge rail 26. The latch engagement openings 34 are provided to permit locking mechanisms 29 on the sub-containers to engage the base 20 and to secure the sub-containers to the base 20.

Alternatively, any other suitable latch engagement devices or structures may be employed for engagement with a locking mechanism. For example, a plurality of elevated bars, arms, or cleats may be located on the base 20, to which hooks, clips, padlocks, or cables located on locking mechanisms may be attached for securing the locking mechanisms to the base 20. Thus, any suitable attachment devices may be employed for attaching and releasing the sub-containers to the base 20. The locking mechanisms 29 used with the latch engagement openings 34 are one example of many equivalent designs which may be used.

The two latch engagement openings 34 in an opening pair are preferably spaced apart from one another by a distance A of approximately 45 to 55 inches, more preferably 50 inches. This distance A corresponds to the spacing of a pair of locking mechanisms 29 on the base section 22 of a sub-container in a lengthwise direction, according to a preferred embodiment.

Each latch engagement opening 34 preferably has a length of approximately 2.0 to 3.5 inches, and a width of approximately 0.5 to 1.5 inches. Accordingly, a longitudinal head portion of a locking mechanism 29 may pass through the opening 34 lengthwise, and then be turned approximately 90 degrees such that the downward-facing surface of the base 20 or edge rail 26 prevents the head portion from passing back through the opening 34. In this manner, a sub-container may be locked to the base 20.

In a preferred embodiment, an elevated latch engagement structure 36 is attached to the top surface of the base 20 adjacent to each widthwise edge of the base 20. Each elevated latch engagement structure 36 is preferably substantially centered in a widthwise direction on the base 20, and includes two latch engagement openings 34 therein for engaging a locking mechanism 29 on each of two adjacent sub-containers. Alternatively, each widthwise edge rail 27 of the base 20 may include a centrally located pair of latch engagement openings 34 defined therein for engaging a locking mechanism 29 on each of two adjacent sub-containers.

Whether the widthwise openings 34 are located in the edge rail 27, or in an elevated latch engagement structure 36 located at an interior region of the base 20, may be determined by the design of the sub-containers employed relative to the base 20. For example, whether all of the locking mechanisms 29 are located in front of (or behind) the caster wheels 24, as illustrated in FIG. 2, or if one or more locking mechanisms 29 are located to the side of the caster wheels, may determine where the widthwise openings 34 are located, due to the placement of the latch mechanisms 29 relative to the openings 34. Additionally, the length of the sub-containers employed may determine whether the locking mechanisms contained thereon are aligned over the edge rail 27, or over the interior of the base 20, in which case an elevated latch engagement structure 36 would preferably be employed.

The latch engagement openings 34 in the lengthwise edge rails 26 located near the corners of the base 20 are preferably spaced apart from the widthwise openings 34 by a distance B of approximately 38 to 44 inches, more preferably 41 inches. This distance corresponds to the spacing of the locking mechanisms 29 in a widthwise direction on the base section 22 of a sub-container.

Latch engagement openings 34 may also be located near the center of the base 20. It is preferred, however, that the openings 34 be located only around the perimeter of the base 20, since openings 34 near the center of the base 20 would often be inaccessible due to the positioning of the guide members 30 and the other sub-containers on the base 20. Accordingly, in a preferred embodiment, three of the four locking mechanisms 29 on a given sub-container will be aligned with latch engagement openings 34 in the base 20 when the sub-container is positioned for attachment to the base 20.

Figure 6:
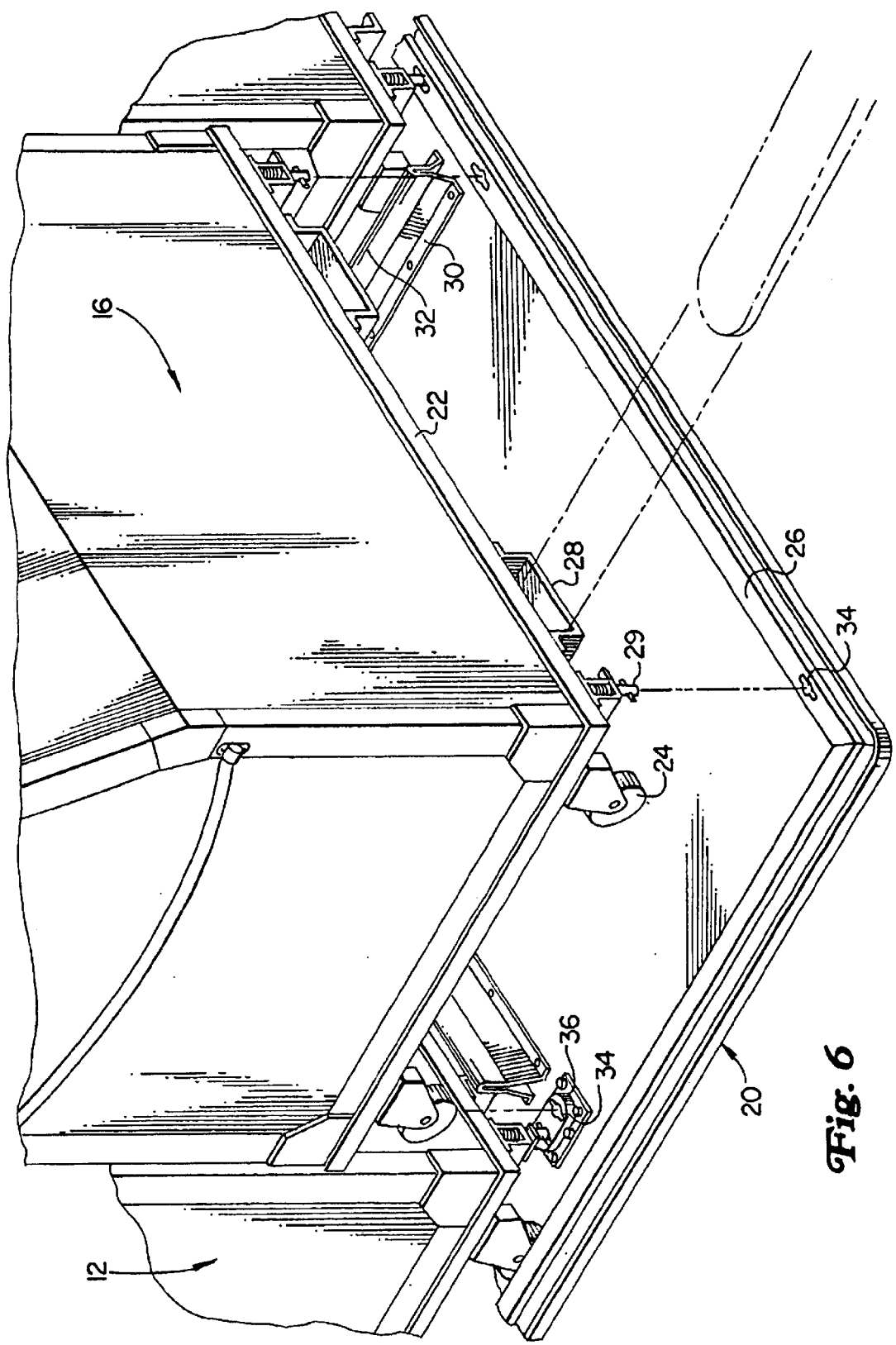
FIG. 6 is a partial exploded view of a sub-container detached from a base.

FIG. 6 is an exploded view of a sub-container 16 detached from a base 20, illustrating how the locking mechanisms 29 may align with and pass through the latch engagement openings 34. In the embodiment shown in FIG. 6, all of the locking mechanisms 29 are located in front of (or behind) their corresponding caster wheels 24. Accordingly, an elevated latch engagement structure 36 is employed to engage a rear locking mechanism 29 on the sub-container 16, as well as on a sub-container 12.

Figure 7C:
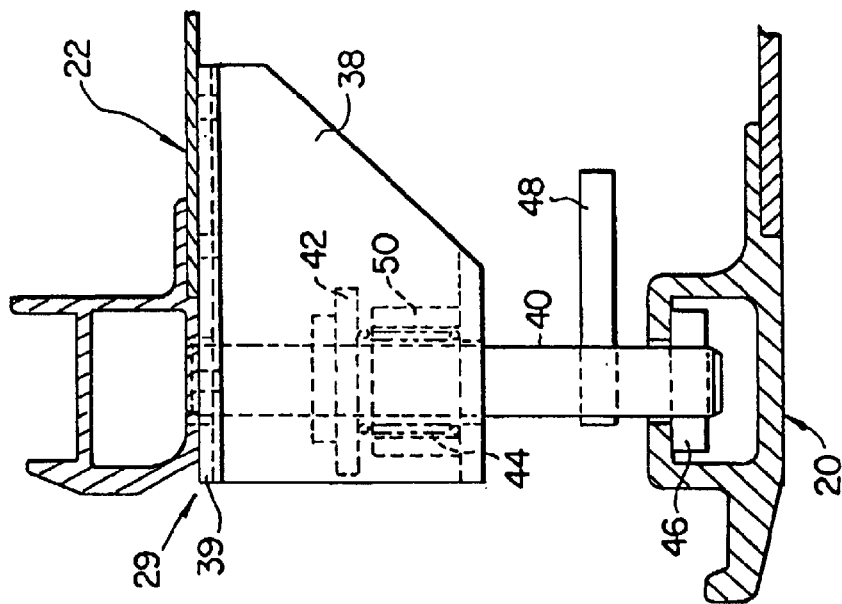
FIG. 7C is a side-sectional view of the preferred locking latch mechanism of FIGS. 7A and 7B in an engaged position.
Figure 7B:
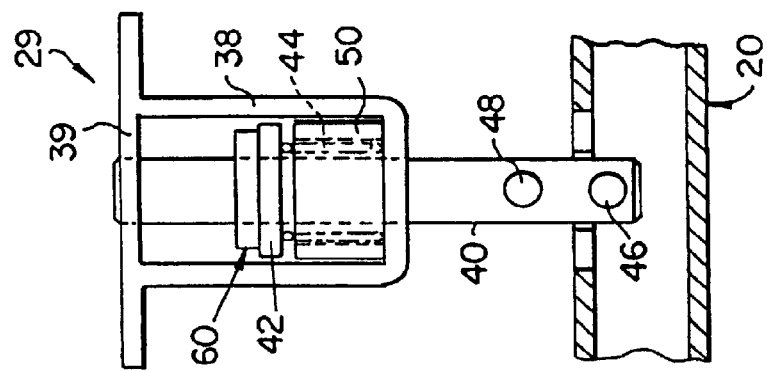
FIGS. 7A and 7B are front-sectional views of a preferred locking latch mechanism in a retracted and an engaged position, respectively.
Figure 7A:
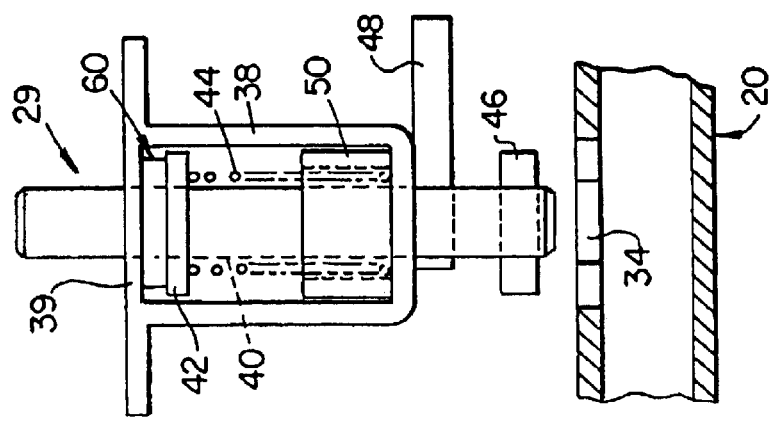

FIGS. 7A–7C illustrate a preferred locking latch mechanism 29 in both a retracted and an engaged position. The locking latch mechanism 29 preferably includes a body 38 that is substantially U-shaped, with a horizontal top section 39, in cross-section. The body is preferably tapered toward an interior region of the base section 22 to which it is attached, as illustrated in FIGS. 2 and 7C.

A rotatable shaft 40 passes through an opening in the top section 39 and a bottom section of the body 38. The shaft 40 is preferably rotatable approximately 90 degrees between an unlocked and a locked position.

A latching plate 42 is attached between the middle and the top end of the shaft 40. The plate 42 is supported by a spring 44, or other biasing element, which biases the plate 42 toward the latch pin 60. The shaft 38 also preferably includes a longitudinal head 46 attached to a bottom end thereof. The head 46 is configured to pass through a latch engagement opening 34 when in an unlocked position, and to engage a downward-facing surface of the base 20 (or edge rail 26 or elevated latch engagement structure 36) when in a locked position.

A lever 48 is attached to the shaft 40 between the head 46 and the bottom section of the body 38 for facilitating manual turning of the shaft 40. The lever 48 is also downwardly displaceable for moving the shaft 40 downward, which causes the head 46 and the plate 42 to be displaced downward, such that the plate 42 compresses the spring 44. A sleeve 50 is preferably disposed within the body 38 to act as a stop for preventing excessive downward movement of the plate 42. When the plate 42 reaches the sleeve 50, the lever is preferably turned approximately 90 degrees so that the head 46 of the latch mechanism 29 engages the base 20.

In use, when a sub-container 12 located at a storage facility or other location is to be delivered to a given destination, the sub-container 12 may be rolled or pushed from the storage area up to a base 20 resting on rollers or a conveyor. If the conveyor is level with the floor, the sub-container is rolled, such that the sub-container 12 may be readily rolled onto the base 20. However, generally the sub-container 12 is placed onto the base using a fork lift truck.

Once the sub-container 12 is located on the base 20, the sub-container 12 is preferably rolled up against the guide members 30. The locking mechanisms 29 on the sub-container 12 are aligned with one or more latch engagement openings 34 in the base 20. In a preferred embodiment, three locking mechanisms 29 are aligned with three latch engagement openings 34.

An operator may then secure the sub-container 12 to the base 20 by performing the following steps:

(1) pushing down the lever 48 attached to the shaft 40 of a locking mechanism 29 such that the longitudinal head 46 of the shaft 40 moves through a latch engagement opening 34 in the base 20 (or edge rail 26 or elevated latch engagement structure 36);

(2) rotating the shaft 40 approximately 90 degrees via the lever 48 such that the head 46 is also rotated approximately 90 degrees; and (3) releasing the lever 48 such that the spring 44 biases the head 46 against a downward-facing surface of the base 20 (or edge rail 26 or elevated latch engagement structure 36), thereby locking the sub-container 12 to the base.

Steps 1–3 are performed for two or more additional locking mechanisms 29 on the sub-container 12. In a preferred embodiment, two locking mechanisms 29 are secured to the base 20 through latch engagement openings 34 in a lengthwise edge rail 26, and one locking mechanism 29 is secured to the base 20 through a latch engagement opening 34 in an elevated latch engagement structure 36, or in a widthwise edge rail 27.

Alternatively, any other suitable combination of latch engagement opening locations may be utilized, depending on the positions of the locking mechanisms 29 on the sub-container 12 and the dimensions of the base 20. For example, three locking mechanisms 29 may be used to engage two openings 34 in the widthwise edge rail 27 and one opening 34 in the lengthwise edge rail 26, or one opening 34 in an elevated latch engagement structure 36. Alternatively, three locking mechanisms 29 may be used to engage three elevated latch engagement structures 36.

Once the sub-container 12 is secured to the base 20, one or more additional sub-containers may be positioned and secured to the base 20. In a preferred embodiment, four sub-containers are secured to the base 20, as illustrated in FIG. 1, but any number of sub-containers may be so secured, depending on the size and configuration of the base 20 and the sub-containers employed.

Once the one or more sub-containers are secured to the base 20, the container assembly 10 is preferably transported out of the storage area by activating the conveyor mechanism or roller mechanism upon which the container assembly 10 rests. The conveyor mechanism may transport the container assembly 10 directly into a transport vehicle, such as a truck or plane, or may be utilized in conjunction with one or more additional transport mechanisms to move the container assembly into the transport vehicle.

Once the container assembly 10 is inside the transport vehicle, the container assembly 10 is moved along rollers, or other suitable transport mechanism, into an appropriate position within the vehicle. After the container assembly 10 is moved away from the entrance to the transport vehicle, additional container assemblies, or other cargo items, may be loaded into the transport vehicle via the conveyor mechanism. When all of the cargo is loaded into the transport vehicle, the one or more container assemblies may then be shipped to their destination.

When the container assemblies arrive at their destination, they may be removed from the transport vehicle via a conveyor mechanism or other suitable transport mechanism. If all of the sub-containers in a given container assembly are destined for the same location, the sub-containers may remain on the base 20 after arrival at the destination. The recipient may then remove the supplies from the sub-containers, via the doors 21 or removable covers on the sub-containers.

If, on the other hand, two or more sub-containers in a given container assembly 10 are destined for different locations within a given destination area, one or more of the sub-containers may be removed from the base 20 upon arrival at the destination area, or upon arrival at the first location. To remove a sub-container from the base 20, an operator preferably turns the lever approximately 90 degrees back to its original position, such that the spring 44 biases the head 46 of the locking mechanism 29 back through the latch engagement opening 34. The sub-container may then be rolled off of the base 20 for delivery to or use by a recipient.

After the supplies are removed from the sub-containers, the sub-containers and/or the container assemblies may be returned to a supply facility, where they may be refilled with supplies. Accordingly, the container assemblies are reusable, and may be used with a variety of supplies.

The present container assembly provides several advantages over existing air cargo container assemblies. No cargo nets are required to secure the sub-containers to the base or container support. This saves significant amounts of time. As the sub-containers are detachably secured to the base, the sub-containers will not roll off of the base during transport.

While embodiments and applications of the present invention have been shown and described, it will be apparent to one skilled in the art that other modifications are possible without departing from the inventive concepts herein. The invention, therefore, is not to be restricted except to the following claims and their equivalents.

What is claim is:

1. An air cargo container system, comprising:
   a base; and
   an air cargo sub-container including a locking mechanism moveable between a first position where the locking mechanism is disengaged from the base, and a second position where the locking mechanism engages the base and secures the sub-container to the base.

2. The system of claim 1 wherein the locking mechanism is on a bottom surface of the sub-container for detachably securing the sub-container to a top surface of the base.

3. The system of claim 1 wherein the sub-container includes at least three locking mechanisms.

4. The system of claim 1 further comprises a guide member on a top surface of the base for aligning one or more sub-container on the base.

5. The system of claim 1 further comprising a plurality of guide members in a cross-shaped pattern on the base.

6. The system of claim 1 wherein the base has a substantially flat bottom surface.

7. The system of claim 1 further comprising a plurality of wheels on a bottom surface of the sub-container.

8. A container assembly, comprising:
   a base; and
   an air cargo sub-container including a locking means moveable between a first position where the locking means is disengaged for allowing movement of the sub-container and a second position where the locking means engages the base for securing the sub-container to the base.

9. The container assembly of claim 8 wherein the locking means is manually moveable between the first and second positions via a lever on the locking means.

10. The container assembly of claim 8 wherein the locking means comprises a latch having:
    a shaft including a top end and a bottom end;
    a head connected to the bottom end of the shaft;
    a plate connected to the shaft adjacent to the top end of the shaft;
    a spring biasing the plate toward a bottom surface of the base; and
    a lever attached to the shaft between the head and the spring.

11. The system of claim 1 wherein the base includes an elevated edge around a perimeter of a top surface of the base, and a plurality of openings located in the elevated edge.

12. The system of claim 1 further comprising a plurality of openings in a top surface of the base at an interior region of the base.

13. An air cargo container unit, comprising:
    a base; and
    an air cargo container including a latch having a shaft, a head, and a spring biasing the latch, and with the shaft moveable between an unlocked position, wherein the head is disengaged from the base, and a locked position wherein the head engages the base to secure the air cargo container to the base.

14. An air cargo container and base combination, comprising:
    a base including a plurality of openings; and
    an air cargo container including a latch with a head biased away from the base, and adapted to move into one of the openings in the base, with the head rotatable into a locked position for securing the container to the base.

15. An air cargo container system, comprising:
    a base; and
    an air cargo container including a moveable locking mechanism for securing the container to the base, and a plurality of wheels on a bottom surface of the container.

16. The cargo container of claim 1 wherein the base comprises a metal plate 0.12 to 0.25 inches thick.

17. An air cargo container system, comprising:
    at least one air cargo container including wheels for rolling the air cargo container, and a plurality of securing mechanisms on the air cargo container;
    a generally flat rectangular base having a plurality of openings, with each securing mechanism engageable with one of the openings on the base; and
    one or more guide members on a top surface of the base, with the wheels of the air cargo container positionable against the guide members to locate the securing mechanisms over the openings.

18. The air cargo container system of claim 1 with the air cargo sub-container further including a pair of forklift guides adjacent to a bottom surface of the sub-container.

19. The system of claim 3 wherein the sub-container has four corners, and three locking mechanisms, and with each locking mechanism located, respectively, at one of the corners of the sub-container.

20. The system of claims 19 further including a wheel on the sub-container adjacent to each corner.

21. The system of claim 1 wherein the container has a length of 45–55 inches and a width of 35–45 inches.

22. The system of claim 1 wherein the base has a length of 110–140 inches and a width of 75–100 inches.

23. The system of claim 13 wherein the base includes an opening for receiving the head of the latch.

* * * * *